(12) United States Patent
Kim et al.

(10) Patent No.: US 8,801,087 B2
(45) Date of Patent: Aug. 12, 2014

(54) COWL CROSS ASSEMBLY

(75) Inventors: Hyun Kim, Hwaseong Si (KR); Hee Sang Park, Hwaseong-Si (KR); June Kyu Park, Hwaseong-si (KR); Jung Hwan Yun, Seoul (KR); Jun Mo Ku, Hwaseong-si (KR); Jin Tae Kim, Suwon-si (KR); Hi Su Cho, Ulsan (KR)

(73) Assignee: Hyundai Motor Company, Seoul (KR)

( * ) Notice: Subject to any disclaimer, the term of this patent is extended or adjusted under 35 U.S.C. 154(b) by 256 days.

(21) Appl. No.: 13/316,428

(22) Filed: Dec. 9, 2011

(65) Prior Publication Data
US 2013/0057026 A1 Mar. 7, 2013

(30) Foreign Application Priority Data

Sep. 5, 2011 (KR) .................. 10-2011-0089765

(51) Int. Cl.
*F16L 23/12* (2006.01)
*B60K 37/00* (2006.01)

(52) U.S. Cl.
USPC .......... 296/193.02; 296/29; 403/335

(58) Field of Classification Search
USPC .......... 296/29, 193.02, 901.01; 464/182; 403/292, 293, 294, 305, 306, 335, 336, 403/337
See application file for complete search history.

(56) References Cited

U.S. PATENT DOCUMENTS

| | | | | |
|---|---|---|---|---|
| 5,222,915 A | * | 6/1993 | Petrzelka et al. | 464/181 |
| 5,318,374 A | * | 6/1994 | Rumberger | 403/277 |
| 5,868,426 A | * | 2/1999 | Edwards et al. | 280/779 |
| 5,934,733 A | * | 8/1999 | Manwaring | 296/72 |
| 6,176,544 B1 | * | 1/2001 | Seksaria et al. | 296/203.02 |
| 6,241,310 B1 | * | 6/2001 | Patelczyk | 296/205 |
| 6,276,739 B1 | * | 8/2001 | Wich | 296/72 |
| 6,299,240 B1 | * | 10/2001 | Schroeder et al. | 296/203.01 |
| 6,382,695 B1 | * | 5/2002 | Decome | 296/70 |
| 6,391,470 B1 | * | 5/2002 | Schmieder et al. | 428/598 |
| 6,619,715 B2 | * | 9/2003 | Rackham | 296/29 |
| 6,644,690 B2 | * | 11/2003 | Brownlee et al. | 280/779 |
| 6,811,195 B2 | * | 11/2004 | Klocke et al. | 296/29 |
| 6,851,742 B1 | * | 2/2005 | Kubiak | 296/193.02 |
| 6,955,394 B1 | * | 10/2005 | Reddig et al. | 296/208 |
| 6,988,764 B2 | * | 1/2006 | Matsutani | 296/193.02 |
| 7,246,966 B2 | * | 7/2007 | Jolley | 403/268 |
| 7,322,106 B2 | * | 1/2008 | Marando et al. | 29/897.2 |
| 7,503,622 B2 | * | 3/2009 | Vican | 296/190.03 |
| 7,503,623 B2 | * | 3/2009 | Favaretto | 296/203.01 |

(Continued)

FOREIGN PATENT DOCUMENTS

| | | | | |
|---|---|---|---|---|
| JP | 01103586 A | * | 4/1989 | B62D 25/00 |
| KR | 20-0427148 | | 9/2006 | |
| KR | 1020070051433 A | | 5/2007 | |
| KR | 100802409 B1 | | 2/2008 | |

*Primary Examiner* — Glenn Dayoan
*Assistant Examiner* — Paul Chenevert
(74) *Attorney, Agent, or Firm* — Morgan, Lewis & Bockius LLP

(57) ABSTRACT

A cowl cross assembly includes a cowl cross bar positioned in the front region of a vehicle body, and a cowl cross half-panel joined to one end of the cowl cross bar. A part of the cowl cross bar made of a steel material is cut, and the cowl cross half-panel made of a plastic material is mounted to the cowl cross bar, thereby reducing the weight and the cost and reinforcing the strength to support the air conditioning equipment. In addition, the cowl cross bar can be easily joined to the cowl cross half-panel to improve the workability.

5 Claims, 3 Drawing Sheets

(56) References Cited

U.S. PATENT DOCUMENTS

| | | | |
|---|---|---|---|
| 7,658,439 B2* | 2/2010 | Meier | 296/193.02 |
| 7,731,261 B2* | 6/2010 | Wenzel et al. | 296/70 |
| 7,841,648 B2* | 11/2010 | Perarnau Ramos et al. | 296/193.02 |
| 7,891,707 B2* | 2/2011 | Kuwano | 280/779 |
| 8,029,045 B2* | 10/2011 | Merkle et al. | 296/193.02 |
| 8,256,830 B2* | 9/2012 | Hitz et al. | 296/193.02 |
| 8,439,591 B2* | 5/2013 | Schmieder et al. | 403/292 |
| 8,512,110 B2* | 8/2013 | Billard et al. | 454/143 |
| 2002/0068521 A1* | 6/2002 | Tanaka et al. | 454/156 |
| 2003/0193207 A1* | 10/2003 | Ito et al. | 296/72 |
| 2003/0227195 A1* | 12/2003 | Charbonnel | 296/208 |
| 2004/0135400 A1* | 7/2004 | Matsuzaki et al. | 296/193.02 |
| 2005/0264040 A1* | 12/2005 | Bailey et al. | 296/193.02 |
| 2006/0283643 A1* | 12/2006 | Simonds et al. | 180/90 |
| 2008/0054681 A1* | 3/2008 | Ellison et al. | 296/193.02 |
| 2009/0152898 A1* | 6/2009 | Kawamura et al. | 296/193.02 |
| 2011/0215614 A1* | 9/2011 | Mani | 296/193.02 |
| 2011/0233964 A1* | 9/2011 | Matsutani et al. | 296/193.02 |
| 2013/0241235 A1* | 9/2013 | Baudart et al. | 296/193.02 |
| 2014/0049075 A1* | 2/2014 | Kasper et al. | 296/205 |

* cited by examiner

COWL CROSS ASSEMBLY

CROSS-REFERENCE TO RELATED APPLICATION

The present application is based on and claims priority from Korean Patent Application Number 10-2011-0089765 filed Sep. 5, 2011, the entire contents of which application is incorporated herein for all purposes by this reference.

BACKGROUND OF INVENTION

1. Field of Invention

The present invention relates to a cowl cross assembly for vehicles, and more particularly, to a cowl cross assembly capable of reducing a weight of a cowl cross member mounted to a vehicle body, and reinforcing the coupling strength between the cowl cross member and an air conditioning equipment mounted to the cowl cross member.

2. Description of Related Art

In general, a cowl cross member is installed to a vehicle body in a horizontal direction to reinforce the strength or rigidity of the vehicle body so that the vehicle body is prevented from being twisted or bent in forward and rearward directions or left and right directions.

The cowl cross member fixes a steering system to the vehicle body and supports ducts of an air conditioning equipment, at a boundary area between an engine compartment and a passenger compartment of the vehicle In this instance, a cowl cross bar is provided to support an instrument panel, in addition to a role of a reinforcing bar. The cowl cross bar is mounted between the passenger compartment and a dash panel, to which electronics are installed, to prevent the dash panel forming the vehicle body from moving in the passenger compartment, thereby improving the safety of passengers.

FIG. 1 is a view illustrating a cowl cross assembly in the related art.

The cowl cross assembly in the related art includes, as shown in FIG. 1, a cowl cross bar 10 formed in the shape of a circular pipe and positioned in the front region of the vehicle body, a cowl box 11 mounted to the cowl cross bar 10 to support a steering assembly, and side mounting brackets 12 for fixing both ends of the cowl cross bar 10 to the vehicle body.

However, the cowl cross assembly in the related art has a problem in that since the cowl cross bar is made of steel, the cost is high and its weight is heavy, thereby lowering gas mileage and thus deteriorating a merchantable quality. In addition, there is another problem in that the coupling strength between the cowl cross bar and the air conditioning equipment is deteriorated.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention has been made to solve the above-mentioned problems occurring in the prior art while advantages achieved by the prior art are maintained intact.

Various aspects of the present invention provide for a cowl cross assembly capable of reinforcing the coupling strength between a cowl cross member and an air conditioning equipment mounted to the cowl cross member, while lowering the weight of the cowl cross member mounted to a vehicle body.

In various aspects of the present invention, there is provided a cowl cross assembly comprising: a cowl cross bar positioned in the front region of a vehicle body; and a cowl cross half-panel joined to one end of the cowl cross bar.

The cowl cross half-panel may be made of a plastic material.

In addition, an air conditioning equipment may be mounted outside the cowl cross bar and the cowl cross half-panel.

Further, the cowl cross bar may have a center support at one end thereof, and a bracket is provided between the center support and the cowl cross half-panel.

Furthermore, the cowl cross bar may be provided with an engaging flange at one end thereof, and the cowl cross half-panel is provided with an engaging bar at one end thereof which is engaged to the cowl cross bar.

Also, the engaging flange may have at a center thereof an engaging rib extending axially outwardly, and the engaging bar is provided at a center thereof with an engaging groove.

The engaging flange and the engaging bar may be provided with fastening holes at the outer side thereof, so that the engaging flange and the engaging bar are fastened to each other by bolts.

The cowl cross assembly according to the present invention includes the cowl cross bar positioned in the front region of the vehicle body, and the cowl cross half-panel joined to one end of the cowl cross bar. A part of the cowl cross bar made of the steel material is cut, and the cowl cross half-panel made of the plastic material is mounted to the cowl cross bar, thereby reducing the weight and the cost and reinforcing the strength to support the air conditioning equipment. In addition, the cowl cross bar can be easily joined to the cowl cross half-panel to improve the workability.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
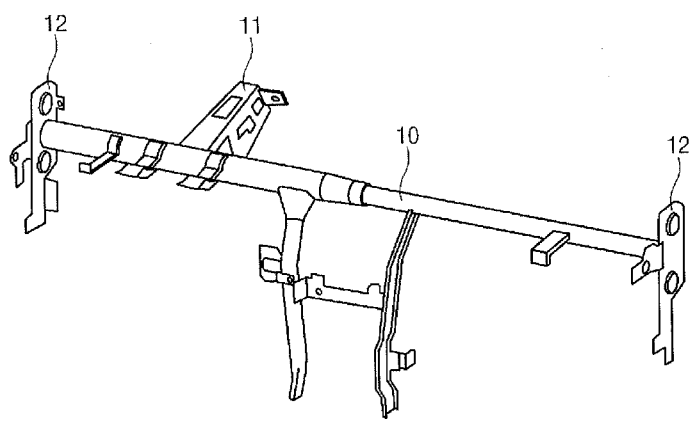
FIG. 1 is a view illustrating a cowl cross assembly in the related art.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Throughout the description of the present invention, the same drawing reference numerals are used for the same elements across various figures.

Figure 2A:
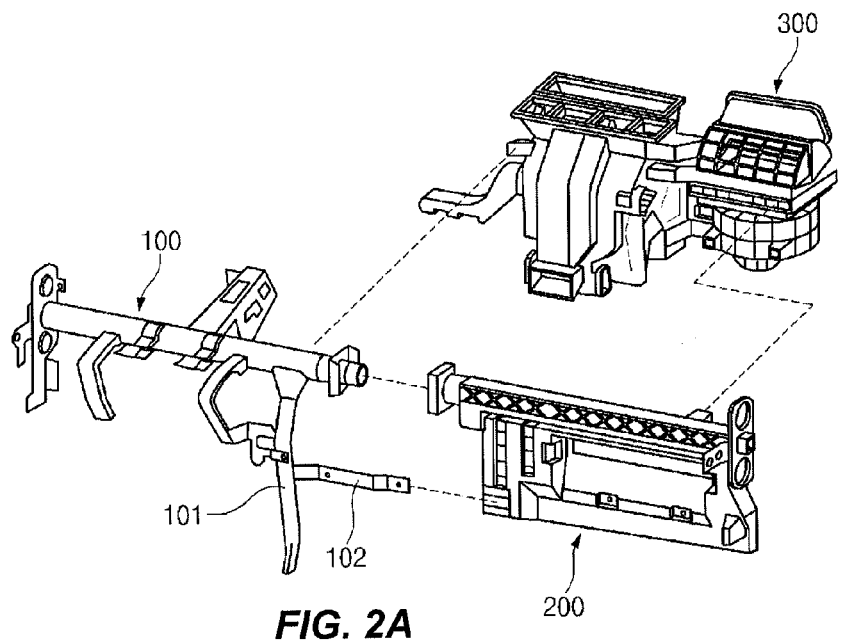
FIG. 2A is an exploded perspective view illustrating an exemplary cowl cross assembly according to the present invention.
Figure 2B:
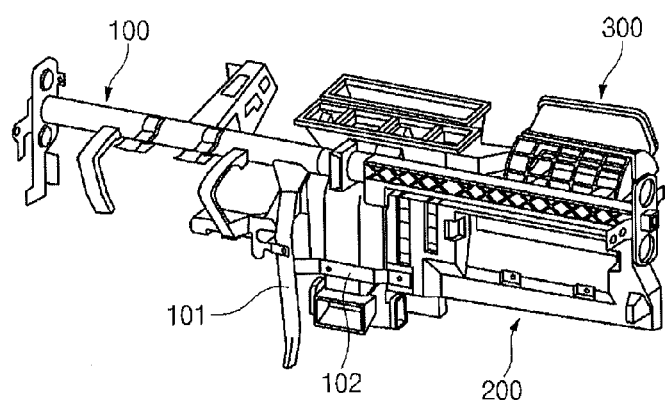
FIG. 2B is a perspective view illustrating the cowl cross assembly of FIG. 2A.
Figure 3A:
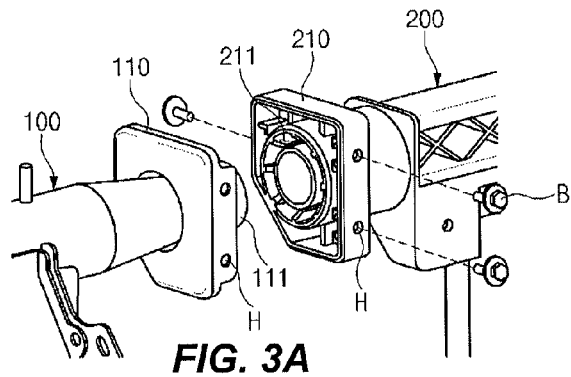
FIG. 3A is a view illustrating the cowl cross assembly of FIG. 2A before a cowl cross bar is joined to a cowl cross half-panel.
Figure 3B:
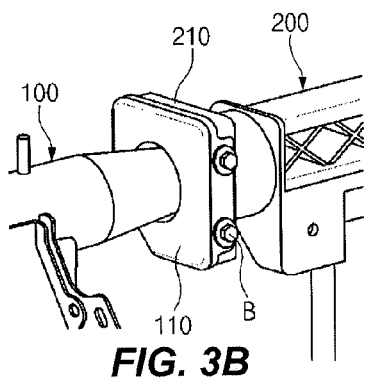
FIG. 3B is a view illustrating the cowl cross assembly of FIG. 2A after the cowl cross bar is joined to the cowl cross half-panel.
Figure 3C:
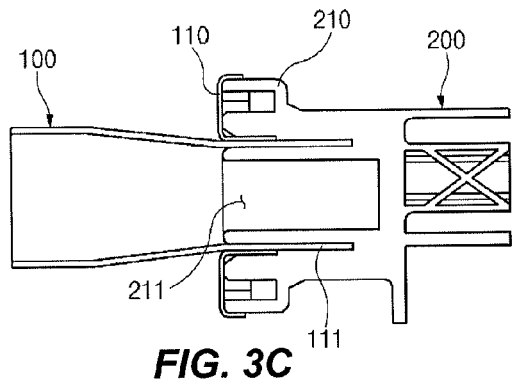
FIG. 3C is a view illustrating the state in which the cowl cross bar of FIG. 2A is joined to the cowl cross half-panel, in the cowl cross assembly according to the present invention.

FIGS. 2A, 2B, and 3A to 3C are views illustrating a cowl cross assembly according to various embodiments of the present invention. FIGS. 2A and 2B are views illustrating an exemplary cowl cross assembly according to the present invention, and FIGS. 3A to 3C are views illustrating a joined state of a cowl cross bar and a cowl cross half-panel in the exemplary cowl cross assembly according to the present invention.

The cowl cross assembly according to the present invention includes, as shown in FIGS. 2A, 2B, and 3A to 3C, a cowl cross bar 100 with a cut part, and a cowl cross half-panel 200 joined to the cowl cross bar 100. Therefore, the cowl cross assembly can reduce the weight to improve the gas mileage of a vehicle, as compared with the cowl cross assembly in the related art.

Each component of the cowl cross assembly according to the present invention will now be described with reference to the accompanying drawings.

First, as shown in FIGS. 2A, 2B, and 3A to 3C, the cowl cross assembly according to the present invention includes the cowl cross bar 100 positioned in the front region of the vehicle body, and the cowl cross half-panel 200 joined to the cowl cross bar 100.

The cowl cross bar 100 is formed in the pipe shape, and is positioned in the front region of the vehicle body in a longitudinal direction. The cowl cross bar fixes a steering system to the vehicle body, and supports ducts of an air conditioning equipment 300.

The cowl cross bar 100 of the present invention is made of a steel material, and, as shown in FIGS. 2A and 2B, a part (a right part in the figure) of the cowl cross bar is cut out.

The cowl cross half-panel 200 is made of a rectangular or c-shaped panel, and is joined to one end of the cowl cross bar 100.

In various embodiments, it may be preferable that the cowl cross half-panel 200 is made of a plastic material.

In addition, in various embodiments, it may be preferable that the air conditioning equipment is mounted to the outside of the cowl cross bar 100 and the cowl cross half-panel 200 in the state in which the cowl cross bar 100 is joined to the cowl cross half-panel 200 to support the air conditioning equipment.

The cowl cross bar 100 has a center support 101 extending downward from one end thereof, and a bracket 102 extending from the center support 101 toward the cowl cross half-panel 200 to engage the center support 101 with the cowl cross half-panel 200.

As shown in FIGS. 3A and 3B, the cowl cross bar 100 is provided with an engaging flange 110 at one end thereof, and the cowl cross half-panel 200 is provided with an engaging bar 210 at one end thereof which is engaged to the cowl cross bar 100. Therefore, the engaging bar 210 is inserted and engaged to the engaging flange 110 so that the cowl cross bar 100 is joined to the cowl cross half-panel 200.

As shown in FIGS. 3A and 3C, the engaging flange 110 has at the center an engaging rib 111 extending axially outwardly, and the engaging bar 210 is provided at the center with an engaging groove 211, thereby improving the engaging ability of the engaging flange 110 and the engaging bar 210.

In addition, the engaging flange 110 and the engaging bar 210 are provided with fastening holes H at the outer side thereof, so that the engaging flange and the engaging bar can be fastened to each other by bolts B via the fastening holes H to improve the fastening force between the engaging flange 110 and the engaging bar 210.

The operation and effect of the present invention will now be described.

As shown in FIGS. 2A, 2B, and 3A to 3C, the cowl cross half-panel 200 made of plastic material is joined to the cowl cross bar 100 with the cut part, thereby reducing the weight of the cowl cross assembly to improve the gas mileage of the vehicle, as compared with the cowl cross assembly in the related art.

The air conditioning equipment is mounted outside the cowl cross bar 100 and the cowl cross half-panel 200. When the air conditioning equipment 300 is mounted, the coupling strength of the air conditioning equipment 300 and the cowl cross half-panel 200, and the air conditioning equipment 300 and the cowl cross bar 100 can be reinforced since the cowl cross half-panel 200 is made of a rectangular or ⊂-shaped panel having a wide area.

In addition, since the center support 101 provided at one end of the cowl cross bar 100 is joined to the cowl cross half-panel 200 by the bracket 102 extending from the center support 101, the coupling force of the cowl cross bar and the cowl cross half-panel is increased.

Meanwhile, as shown in FIGS. 3A and 3B, the engagement of the cowl cross bar 100 and the cowl cross half-panel 200 is achieved by engaging the engaging flange 110 formed at one end of the cowl cross bar 100 with the engaging bar 210 formed at one end of the cowl cross half-panel 200. The engaging bar 210 is inserted into the engaging flange 110, and thus the engaging rib 111 formed at the engaging flange 110 is inserted into the engaging groove 211 formed at the engaging bar 210. As a result, the cowl cross bar 100 is joined to the cowl cross half-panel 200.

In this instance, when the cowl cross bar 100 is joined to the cowl cross half-panel 200, the engaging flange 110 and the engaging bar 210 are fastened to each other by the bolts B from the outside in order to improve the coupling force thereof, thereby preventing the cowl cross bar 100 and the cowl cross half-panel 200 from being separated.

The cowl cross assembly according to the present invention includes the cowl cross bar positioned in the front region of the vehicle body, and the cowl cross half-panel joined to one end of the cowl cross bar. A part of the cowl cross bar made of the steel material is cut, and the cowl cross half-panel made of the plastic material is mounted to the cowl cross bar, thereby reducing the weight and the cost and reinforcing the strength to support the air conditioning equipment. In addition, the cowl cross bar can be easily joined to the cowl cross half-panel to improve the workability.

For convenience in explanation and accurate definition in the appended claims, the terms front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A cowl cross assembly comprising:
   a cowl cross bar positioned in a front region of a vehicle body; and
   a cowl cross half-panel joined to one end of the cowl cross bar;
   wherein the cowl cross bar is provided with an engaging flange at one end thereof, and the cowl cross half-panel is provided with an engaging bar at one end thereof engaged to the cowl cross bar;
   wherein the engaging flange has at a center thereof an engaging rib extending axially outwardly, and the engaging bar is provided at a center thereof with an engaging groove to receive the engaging rib; and
   wherein the engaging rib is mounted inside the engaging groove and the engaging flange is disposed outside the engaging groove and encloses an outer surface of the engaging bar positioned between the engaging groove and the engaging flange.

2. The cowl cross assembly according to claim 1, wherein the cowl cross half-panel is made of a plastic material.

3. The cowl cross assembly according to claim 1, wherein an air conditioning component is mounted outside the cowl cross bar and the cowl cross half-panel.

4. The cowl cross assembly according to claim 1, wherein the cowl cross bar has a center support at one end thereof, and a bracket is provided between the center support and the cowl cross half-panel.

5. The cowl cross assembly according to claim 1, wherein the engaging flange and the engaging bar are provided with fastening holes at the outer side thereof, so that the engaging flange and the engaging bar are fastened to each other by a bolt.

* * * * *